United States Patent
Hubacher et al.

(10) Patent No.: US 6,539,473 B1
(45) Date of Patent: Mar. 25, 2003

(54) REMOTELY CONTROLLED BOOT MANAGER

(75) Inventors: Kenneth Hubacher, Austin, TX (US); Dennis Sposato, Austin, TX (US); Philip C. Theiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,440

(22) Filed: Sep. 2, 1999

(51) Int. Cl.[7] ............................................. G06F 9/445
(52) U.S. Cl. ..................... 713/2; 713/1; 709/203; 709/219; 709/222; 717/173; 717/178
(58) Field of Search ................. 709/203, 219–222; 713/1, 2; 717/171–173, 176–178

(56) References Cited

U.S. PATENT DOCUMENTS

| | | | |
|---|---|---|---|
| 5,280,627 A | * 1/1994 | Flaherty et al. ............... 709/22 |
| 5,577,210 A | 11/1996 | Abdous et al. ......... 395/200.1 2 |
| 5,828,888 A | * 10/1998 | Kozaki et al. .................. 713/2 |
| 5,842,011 A | 11/1998 | Basu .......................... 395/652 |
| 5,870,554 A | 2/1999 | Grossman et al. ...... 395/200.52 |
| 5,948,101 A | * 9/1999 | David et al. .................. 709/222 |
| 6,209,089 B1 | * 3/2001 | Selitrennikoff et al. ......... 713/2 |
| 6,226,667 B1 | * 5/2001 | Matthews et al. ........... 709/203 |
| 6,311,165 B1 | * 10/2001 | Coutts et al. ................ 235/379 |
| 6,421,777 B1 | * 7/2002 | Pierre-Louis et al. ........... 713/2 |

* cited by examiner

Primary Examiner—Jeffrey Gaffin
Assistant Examiner—Ilwoo Park
(74) Attorney, Agent, or Firm—David A. Mims, Jr.; Rudolf O. Siegesmund

(57) ABSTRACT

An apparatus and method for the administrator of a computer network to make changes to boot manager configuration from a server without any direct involvement at the local workstation.

7 Claims, 9 Drawing Sheets

REMOTELY CONTROLLED BOOT MANAGER

FIELD OF THE INVENTION

The present invention relates to the control of operating systems sent by a server computer system to a client computer system in response to a request by the client computer system.

BACKGROUND OF THE INVENTION

A computer or computer system, when turned on, must be prepared for operation by loading an operating system. In the normal operation of a single computer system, when a user issues a boot command to the computer, the computer responds to the boot command by attempting to retrieve the operating system files from the computer systems memory. Configuration data files are also needed to configure the specific machine with the hardware parameters necessary for the specific hardware configuration. These files also contain information needed to initialize videos, printers, and peripherals associated with the particular machine. For example, the files would include CONFIG.SYS in the MS-DOS operating system, available from Microsoft Corporation.

Computers or computer systems can be connected in a network normally consisting of a client workstation, a server and a central network. In a system where the computer's storage is maintained when the power is turned off, the operating system can be stored in the computer itself. In a system where the computer has only storage that is lost when the power is turned off, the computer cannot retrieve the boot information from within the computer itself. In that case, the client sends a request for the operating system files via the network to the server acting as a boot server. Even when the client workstation has non-volatile storage capability, it is advantageous to boot from the server because memory space is saved in the workstation computer. As operating system and application programs expand to provide new and greater capabilities, booting from a server can be highly advantageous.

Remote booting of a client workstation from a server is known in the art. U.S. Pat. No. 5,842,011 discloses a method for booting a local workstation from a server where the network is established by sending the operating system to the workstation when the power is turned on at the local workstation. The local workstation then boots from the transferred operating system which is now in its memory. U.S. Pat. No. 5,557,210 discloses a method for booting the local workstation where the operating system is transferred to the local workstation by the server in response to the first interruption produced by a terminal after it is turned on.

Several methods of remote booting exist in the marketplace. One is called Remote Initial Program Load (RIPL). RIPL is the process of loading an operating system onto a workstation from a remote location. The RIPL protocol was co-developed by 3Com, Microsoft, and IBM. It is used today with IBM OS/2 Warp Server, DEC Pathworks, and Windows NT. Two other commonly used Remote IPL protocols are a Novell NCP (NetWare Core Protocol), and BOOT-P, an IEEE standard, used with UNIX and TCP/IP networks.

RIPL is achieved using a combination of hardware and software. The requesting device, called the requester or workstation, starts up by asking the loading device to send it a bootstrap program. The loading device is another computer that has a hard disk and is called the RIPL server or file server. The RIPL server uses a loader program to send the bootstrap program to the workstation. Once the workstation receives the bootstrap program, it is then equipped to request an operating system, which in turn can request and use application programs. The software implementations differ between vendors, but theoretically, they all perform similar functions and go through a similar process. The client workstation requires a special Read Only Memory (ROM) installed on its (Local Area Network) LAN adapter or Network Interface Card (NIC). The special ROM is known generally as a remote boot ROM, but two specific examples of remote boot chips are the RIPL chip, which supports ANSI/IEEE standard 802.2, and the Preboot Execution Environment (PXE) chip, which is used in the Transmission Control Protocol/Internet Protocol (TCP/IP) environment.

While the process has many advantages for booting a computer that has volatile storage, such as a network computer, the computer is required to have a remote boot ROM on the LAN adapter or Network Interface Card (NIC). The remote boot ROM requirement does not allow any user interaction with the remote boot process. Application Ser. No. 09/329,457, now U.S. Pat. No. 6,463,530, discloses a remote boot process that does not require a remote boot ROM on the LAN adapter or NIC. Existing boot manager configurations allow different partitions to be booted based on the user's choice from a menu at machine start time. The selection criteria for the menu is hard coded on the local machine hard drive. Therefore, changes to the boot manager configuration must be done locally at the machine and normally require a reboot post configuration, a very tedious process in a large enterprise environment involving thousands of machines.

Therefore, a need exists for a remotely controlled boot manager which would allow the administrator to change the boot manager configuration remotely, from a server, and have the workstation pick up those changes every boot. Administrators could then configure items such as what to boot, timeout values, and defaults from a server rather than at the local machine.

Thus, a need exists for an apparatus and method in a LAN/WAN environment for remote administration of workstation boot choices.

SUMMARY OF THE INVENTION

The invention meeting the needs identified above is a Remotely Controlled Boot Manager which provides an apparatus and method for the administrator to make changes to boot manager configuration from a server without any direct involvement at the local workstation. The Remotely Controlled Boot Manager comprises a set of programs at the workstation and a a menu control program at the server.

A set of programs at the workstation allows a remote boot and interaction with a menu control program on the server. Instructions from a Basic Input Output System (BIOS) ROM are executed to load a Boot Code Loader (BCL) from a nonvolatile, read/write memory, such as a diskette or hard disk. The BCL executes to load a Remote Control Program (RCP) from the diskette, and the RCP executes to load a message program, a protocol manager and/or device drivers from the diskette without loading an operating system. The message program and/or device drivers communicate with a menu control program called RIPLMENU in the network server. The program will interface with an NDIS compliant Network Interface Card (NIC) to send out a discovery frame. At this point the workstation seeks menu specific information. The discovery frame will be intercepted by RIPLMENU installed on the server which will be running and listening for the request. Once the second program intercepts the request it will send back the boot manager menu information for that workstation. The workstation will present the menu to the user on the display. Once a choice is made by the user the corresponding boot attempt is made. If the boot device is unavailable and a time-out value and prioritized list is supplied the process will continue to attempt to boot for the amount of time expressed by the value. If time-out expires the next bootable option is attempted. The process continues until a successful boot occurs. If no boot occurs the boot menu is redisplayed. If no time out value is supplied, the boot manager menu is displayed immediately after a boot failure. The menu information is passed to the client by way of this process and this gives the administrator the ability to change the options remotely. Once the administrator makes a change in RIPLMENU, the change takes effect upon the next boot of that client. If setup properly throughout the environment, the workstation can be moved from one location to another and receive the same or different boot manager information (i.e. laptops). The administrator can arbitrarily make changes to the choices presented to the user or can change the default boot (in the case where the user isn't presented a choice). If desired, the administrator could choose, rather than the user, which system is booted. The invention accomplishes this by combining an existing system for remote booting without ROM hardware with a menu control program at the server which is queried automatically by the workstation at startup.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
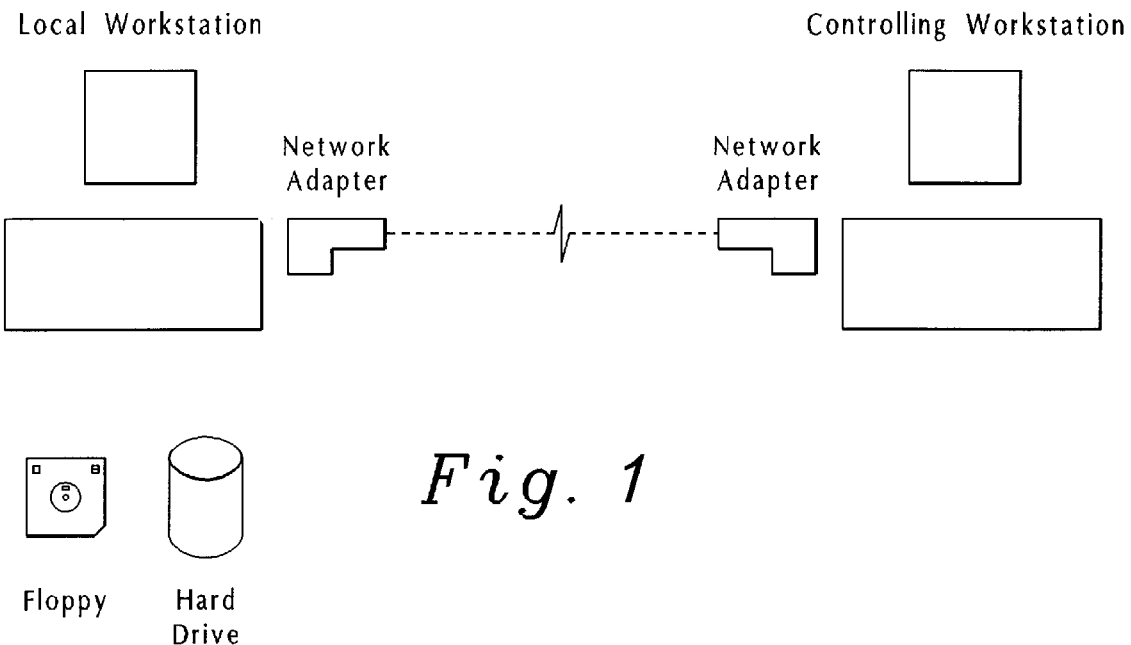
FIG. 1 depicts an overview of the system.

FIG. 1 depicts an overview of the system which involves a controlling workstation and a local workstation, each connected to the other and each having a network adapter.

Figure 1A:
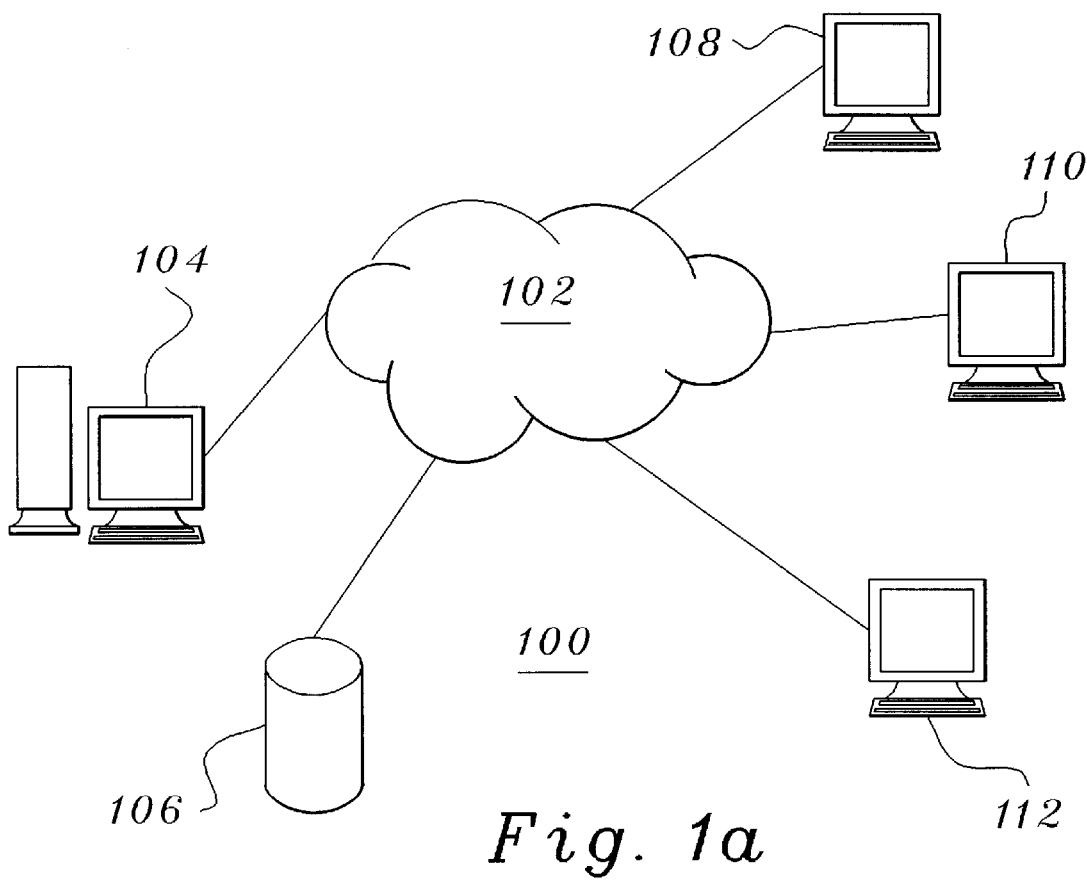
FIG. 1A a distributed data processing system.

FIG. 1A depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

Figure 2:
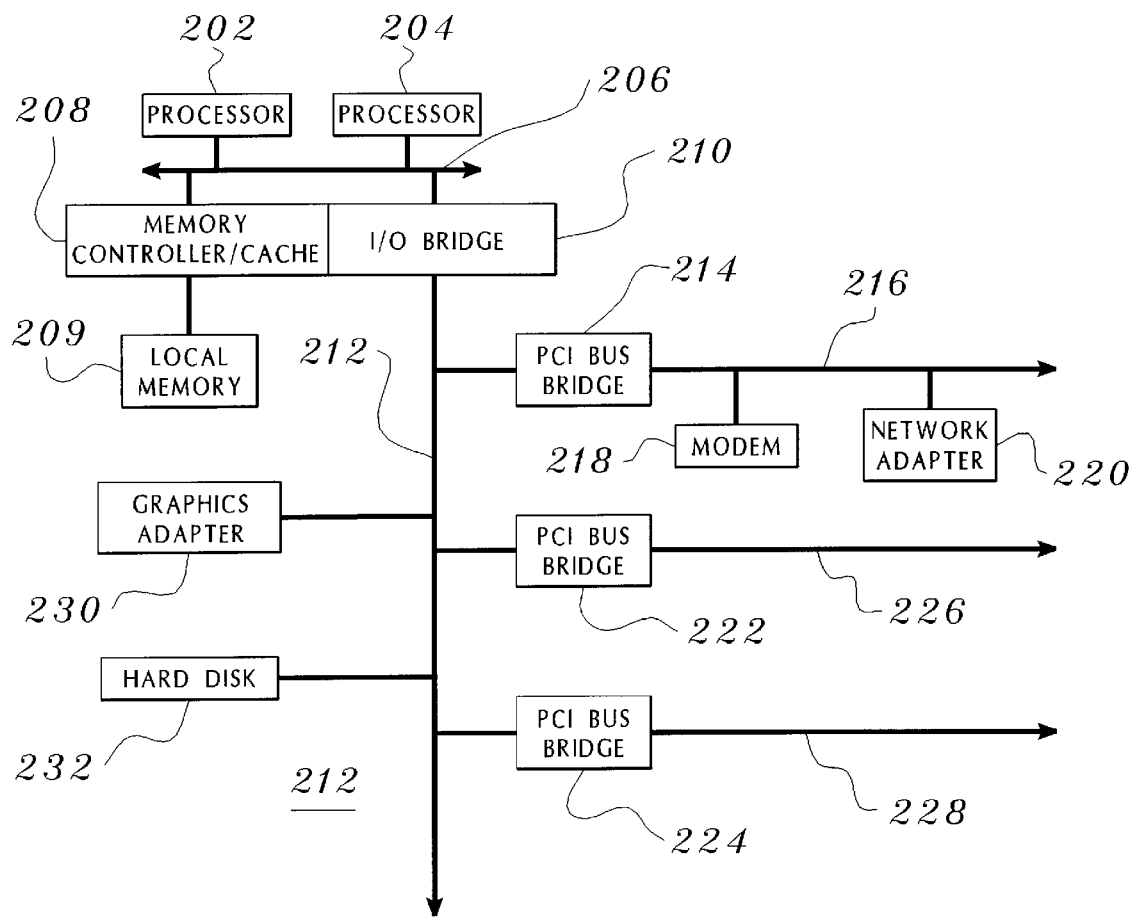
FIG. 2 depicts a block diagram of a server.

For purposes of this application, a network computer is any computer, coupled to a network, which receives a program or other application from another computer coupled to the network. In the depicted example, server 104 provides data, such as boot files, operating system images, and applications to clients 108, 110 and 112. Clients 108, 110, and 112 are clients to server 104. Server 104 may also act as a boot server because it stores the files and parameters needed for booting each of the unique client computers systems 108, 110, and 112. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN). Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. Modem 218 may be connected to PCT bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced interactive Executive (AIX) operating system.

Figure 3:
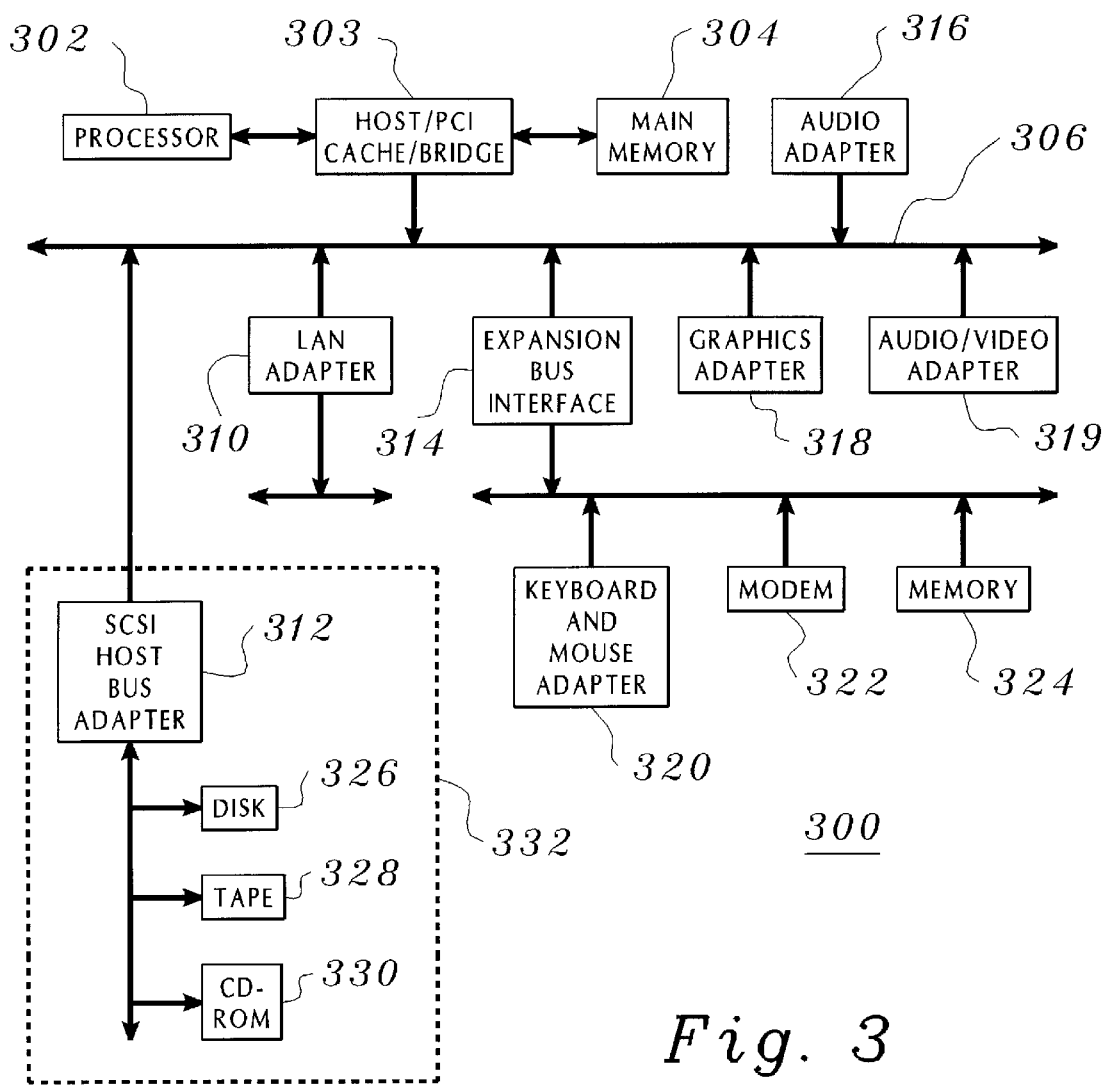
FIG. 3 depicts a block diagram of a work station.

With reference now to FIG. 3, a block diagram illustrates a data processing system in which the Remotely Controlled Boot Manager may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It s important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
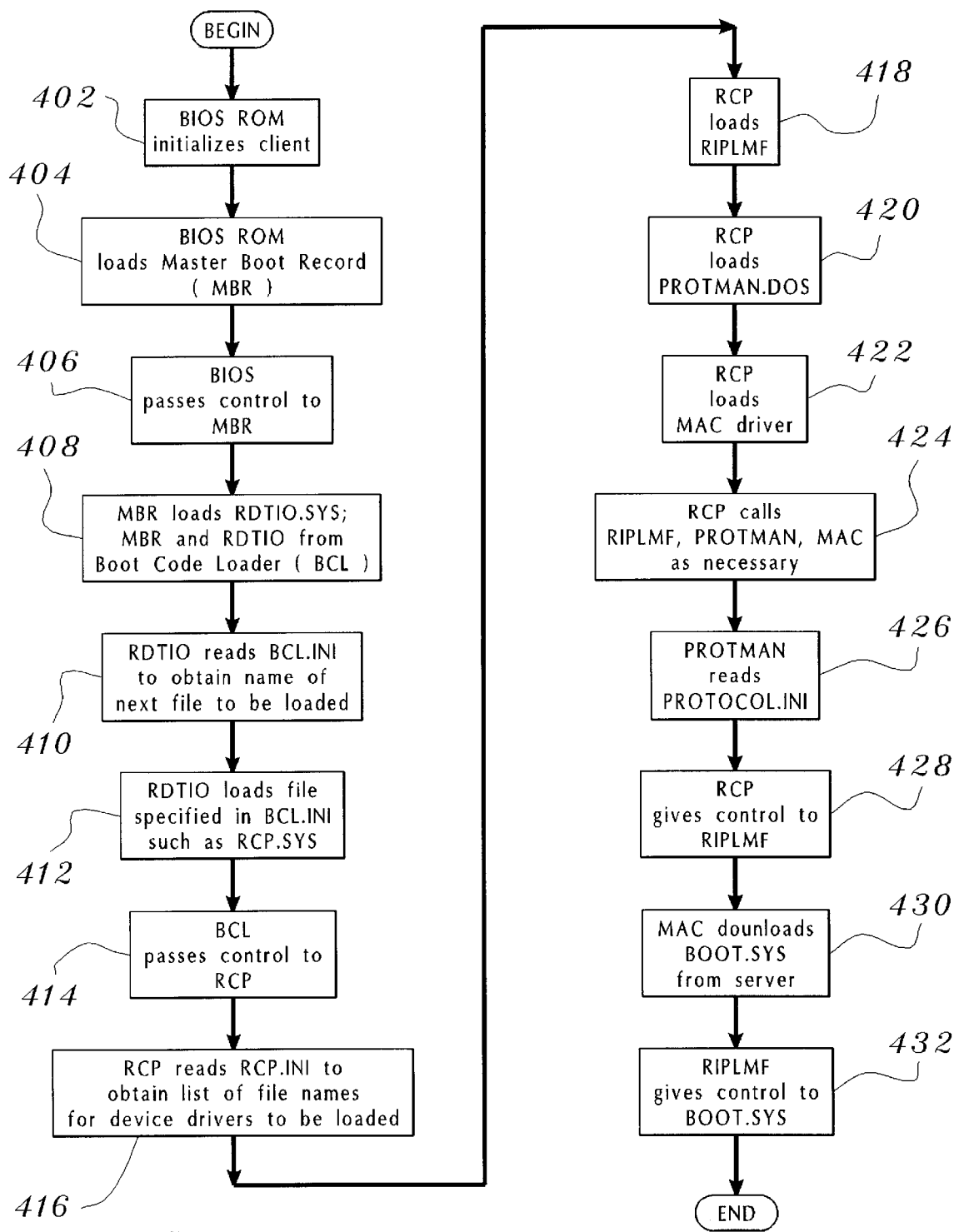
FIG. 4 depicts a flow chart of the workstation process.

With reference now to FIG. 4, a flowchart depicts the steps used in the Remote Client Boot. When a PC is booted, the BIOS ROM chip initializes the system by executing POST (Power-on Self-Test) code and by setting up the BIOS vector tables in low memory and by selecting a boot source (step 402). On newer systems, this is a selectable parameter in the hardware system BIOS setup procedure. If the system has been allowed to select a diskette drive as a boot device, BIOS ROM instructions reads the first sector of the diskette into memory at a predefined location (step 404). This sector is called the Master Boot Record (MBR). The BIOS then gives control to MBR (step 406).

The MBR, Cyl 0, Head 0, Sector 1 of the diskette is the first thing loaded into the client system after POST processing is completed. The MBR module is no larger than 512 bytes and contains the partition boot table for the diskette. The MBR module also contains an identity stamp and a micro file system with the ability to load a RDT Input Output Module (RDTIO) (step 408). The micro file system has the capability of reading one sector of any file contained in the root directory of a diskette employing the 12-bit FAT architecture. The file name for RDTIO is hard-coded in the MBR and is not user-changeable.

RDTIO.SYS is a one sector file that is read into memory by the MBR. Together, the RDTIO and the MBR make up the BCL. RDTIO adds enough capability to the file system to allow reading additional files.

The first file read by BCL is its initialization file. This file, BCL.INI, contains the name of a self loading, multi-sectored file that can be found in the root directory of the diskette. When this file is successfully read into memory, it will be give control and BCL will no longer be required. The syntax for the BCL.INI file is very restrictive. There are only two parameters in capital letters. The parameters are the name of the file to load and the address of the desired location. For example, RCP.SYS,0000:7C00. This instructs the BCL to load file RCP.SYS at location 000:7C00 in real memory. There is no error checking so the file must be in the root directory of the diskette. If the address field is optional, the 7C00 is the default. However, if the address field is used, the address field allows the BCL to load images directly into memory from the disk or diskette. The file name must start at the first location in the file.

BCL.INI contains the name of the next file to load (step 410). BCL.IM specifies a file that contains a self-supporting program or module, as it will be given control at a predetermined area and BCL will terminate execution, leaving the newly loaded module on its own. In RCB's case, this file's name is RCP.SYS-RDT, or the "RDT Control Program" which consists of RCP.SYS and RCP.INI. The RCT Control Program is loaded by the BCL. Once loaded, there is no longer any dependency on the BCL for services. The RCP contains its own mini file system consisting of enough logic to read multi-sectored files from the root directory of a diskette which is formatted using 12-bit FAT architecture.

RDTIO loads RCP.SYS (step 412) and passes control to RCP (step 414). RCP's task is to load additional files, such as device drivers, provide DOS function emulation in support of these drivers, and load other components of RCB, specifically the RIPL Message Formatter (RIPLMF). RCP receives its instructions from an .INI file called RCP.INI (step 416) in the root directory of the diskette. These instructions are in the form of file names. RCP.INI will be parsed and displayed on the console as it is used. The purpose of the INI file is to tell RCP which drivers it needs to load to support the particular NIC on the system in which it is running. The RCP also has the responsibility of providing DOS function emulation to the device drivers when they are in their initialization routines. RCP allows the device drivers to execute as though they were in a real DOS environment. RCP further allows different drivers to be loaded for individual NICs without forcing source code changes in the RCP. The syntax is:

msgf=[file name] where "file name" is the name of any "Message Formatter" that is to be used for this boot, i.e.: "msgf=riplmf.sys".

load=[file name] where "file name" is the name of any module that has to be loaded to make RCB work. At a minimum, the DOS device drivers, for the NIC in the machine, must be identified this way, i.e.: "load=device.sys".

ip=[ip address] where "ip address" is the dotted decimal IP address, i.e.: ip=123.456.789.012."

mac=[mac address] where "mac address" is the 12 hex digit MAC address in a continuous string, i.e.: mac=001122334455".

Each entry must be separated by any, or all, of the following characters:

20h=Space
    Oah=Carriage return
    Odh=line feed

Almost any editor can be used to create the file.

RIPLMF is loaded first (step 418) followed by the device drivers. The DOS Protocol Manager (PROTMAN.DOS) is usually loaded next (step 420) followed by the NIC driver, also referred to as the MAC driver (step 422). The RCP will call each driver (step 424), in turn, allowing it to perform its initialization routines, open files, display messages, etc. PROTMAN.DOS will request a file called PROTOCOL.INI to be read in during this time (step 426). This file is requested by the MAC driver from PROTMAN.DOS during an inter-module conversation when the MAC is initialized. The MAC causes messages to be sent and received on the LAN.

PROTMAN.DOS is the DOS protocol manager device driver. According to the NDIS specification, "the Protocol Manager reads the PROTOCOL.INI file at INIT time and parses it to create the configuration memory image passed to the protocol modules." The RCB uses it for just that purpose. The MAC driver will issue Input/Output Controls (IOCTLs) to PROTMAN.DOS to get this information, as well as information about the protocol drivers that wish to be bound to it. RIPLMF presents itself to PROTMAN.DOS as though it were a protocol driver requesting to be bound to the MAC. This is done by placing entries in the PROTOCOL.INI file which make RIPLMF look like a protocol driver and through IOCTL calls from RIPLMF to PROTMAN.DOS. RCB emulates most of the other additional BindAndStart and InitiateBind logic which, in a DOS environment, comes from additional support programs. These programs are unnecessary in the RCB system.

The PROTOCOL.INI file used by RCB can be the same one that is included in the BOOT.SYS image assembled in the server with some minor changes. RIPLMF has to be added to it as follows:

[RIPLMF-MOD]
    Driver Name=RIPLMF$
    Bindings=ELPC3

The "Bindings=" statement must point to the MAC driver, in this case ELPC3. The example above was taken from the PROTOCOL.INI used with the 3Com 3C589 PCMCIA Ethernet card.

The entire file looks like this:

[protman$]
        Driver name=protman$
    [ELPC3]
        Driver name=ELPC3$
        PCMCIA_ENABLER=YES
    [RIPLMF-MOD]
        Driver name=RIPLMF$
        Bindings=ELPC3

The device drivers used by RCB are also called ANSI/IEEE standard 802.2 drivers. RCB requires the drivers specific to the DOS environment. The EL90X.DOS is used to support the #Com3C509 PCI Ethernet card. The ELPC3.DOS driver supports the 3Com#C589 PCMCIA Ethernet card.

When all initialization is complete, RIPLMF is given control (step 428), and the services of RCP are no longer required. RIPLMF is a hybrid application program and NDIS protocol device driver. It follows the NDIS specification in its actions with both PROTMAN.DOS and the MAC driver. RIPLMF's relationship to these two other programs is that of a protocol driver; however, RIPLMF also "formats" messages and present them to the MAC for delivery. Since the other drivers must be made to believe they are working in an NDIS environment, RIPLMF also does emulation in two areas, "BindAndStart" and "InitiateBind." According to NDIS, a protocol driver must be bound to a MAC driver. Therefore, RIPLMF binds to the MAC such that the MAC cannot tell the difference between RIPLMF or a DOS NDIS protocol driver.

RIPLMF will carry on a conversation with the MAC, requesting it to send certain messages out on the LAN. The MAC will communicate with the server to obtain the boot block, called RIPLMENU. RIPLMF asks the MAC to send: "Find" and "GetMenu". The find message is replied to by a "Found" from the server. Once RIPLMF knows the server menu has been found, it sends out the "getmenu" message. The server responds by sending the menu choices from RIPLMENU to the client.

When all segments of programs selected from the menu have been received, RIPLMF resets any vectors that may have been used by RCP and the other drivers, and gives the system over to the programs selected from the menu. At this point no components of RCP are required, nor can they be found in the system. The find/found dialog is based on an address that NDIS calls the Permanent Station Address. This address, which is hard wired into the NIC itself, becomes part of the outgoing message, and this is the field the server uses to decide which RIPLMENU image to send to the client. The administrator will have made the decisions about which choices will be sent to which workstations.

When this file is downloaded (step 430), RIPLMF will perform some housekeeping routines and give control to BOOT.SYS (step 432). BOOT.SYS then completes the boot process to load an operating system from the network server (step 434) based on the choices made by the user. If the boot device is unavailable the process will continue to attempt to boot for the amount of time expressed in a time-out value set in RIPLMENU. When the time expires the next bootable option will be attempted. If no time out value is supplied then the boot manager menu is displayed immediately after a boot failure. RIPLMENU is the controlling mechanism that interacts with each and every client request for the menu file. The network interface between the client and RIPLMENU may be IP based which means that the machine RIPLMENU, the menu controller, is running on must also be running TCP/IP. RIPLMENU receives a User Datagram Protocol (UDP) datagram request from the client and sends back the information in a UDP packet. One implementation would be written in JAVA. RIPLMENU could be run on any platform that has a JVM and is TCP/IP enabled. The following languages are suitable for the programs Assembler, C, C++, Cobol, Pascal, Java, SmallTalk, Perl, Rexx, LISP, APL, BASIC, PLI, PLII. The following protocols are suitable: NETBIO; TCP/IP; 802.2; SNA, SNB, IPX and APPLETALK.

Everything that occurs in the workstation computer is based on the MAC address, which is a hardware name embedded in the chip. A server on the LAN that recognizes the client computer's MAC address will respond in a predetermined way. The RCB allows a selection of MAC addresses that can provide different boots for different uses. Therefore, the RPL/PXE Emulation of the first programs further allows the option of remote booting of multiple operating systems. For example, with the RPL/PXE emulation and its ability to alias the MAC address, the RIPLMENU can offer different operating systems from the same server, different operating systems from different servers, different versions of the same operating system from the same server and different versions of the same operating system from different servers. Moreover, RIPLMENU can be offered from a primary server, a backup server or a different server. Additionally, RIPLMENU can present different workstation functions.

To implement these types of options the administrator would define the appropriate workstation records on the appropriate boot servers. For example, for an administrator to give workstations the ability to choose between a primary or backup boot server the administrator would define the same workstation with a different MAC address on both servers, then in the menu's configuration file, define one of the MAC addresses as the primary and one as the backup, and when a choice is made the corresponding MAC address is broadcast out and only the server where that particular MAC address is defined will respond. The result is that the client will RPL boot from the server that the user chose.

Figure 5A:
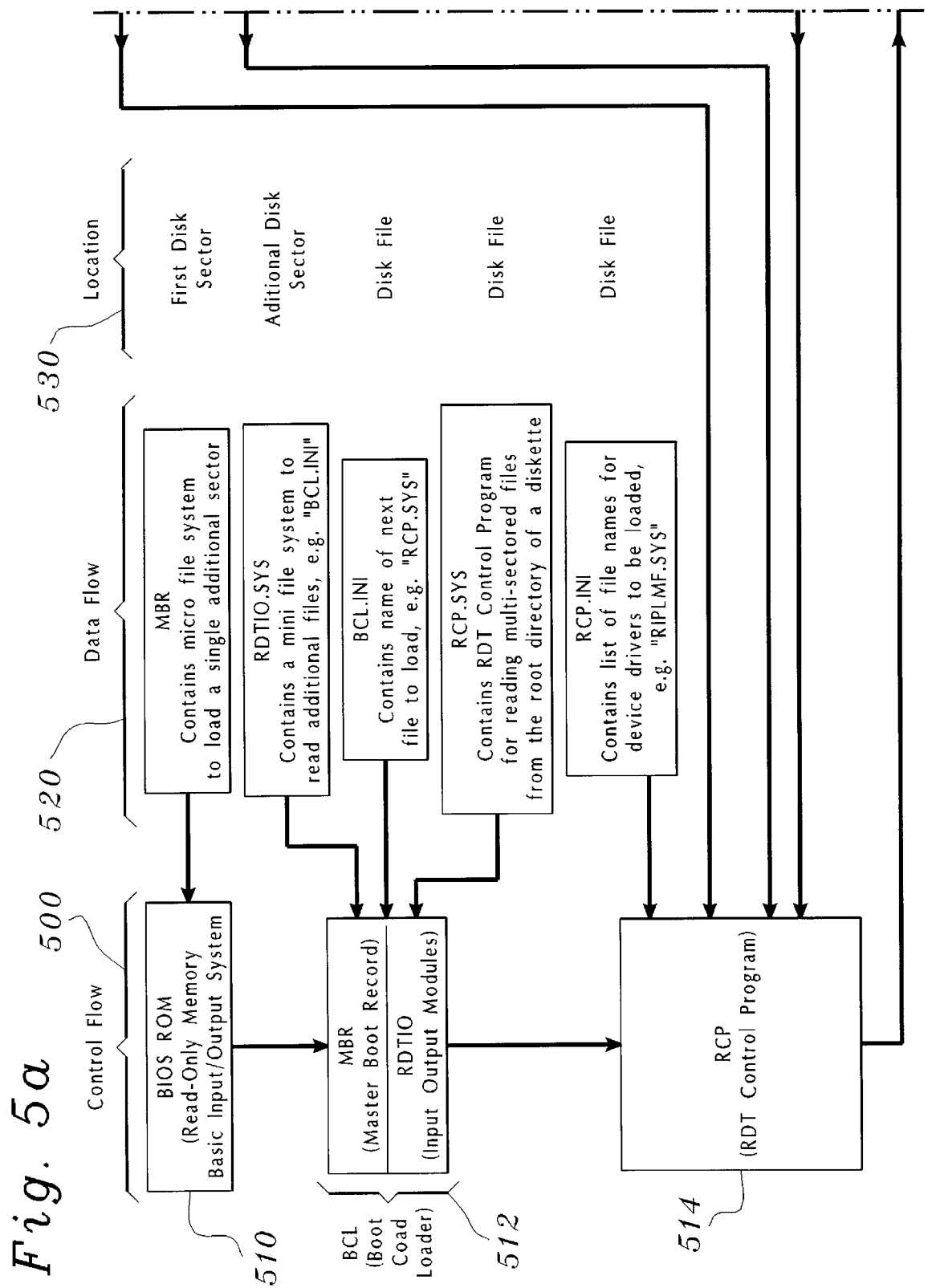
FIG. 5 depicts a flow chart of the workstation process.
Figure 5B:
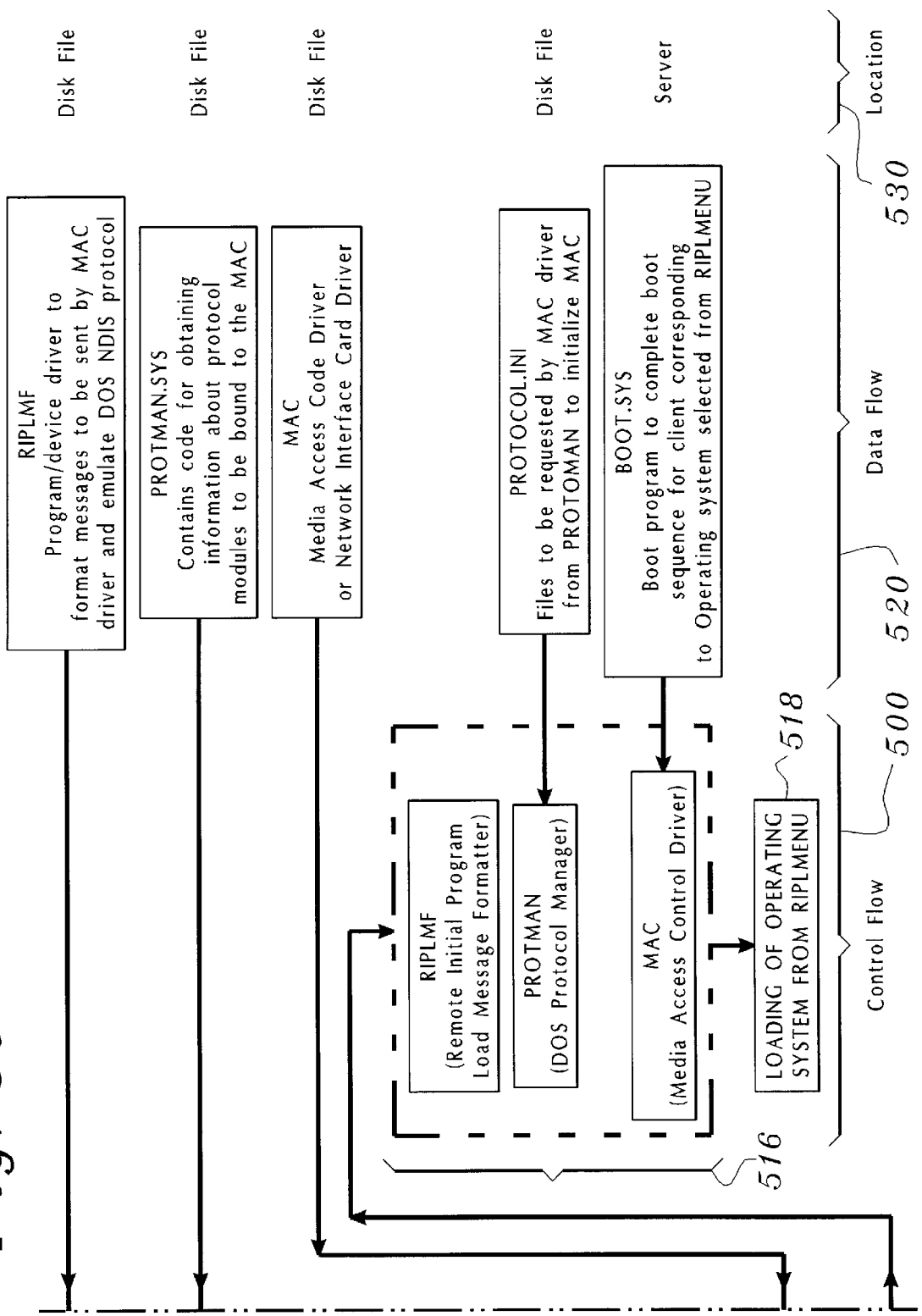

With reference now to FIG. 5, a flowchart depicts the control flow, the data flow, and the location of data and instructions used in the Remote Client Boot. This figure provides a slightly different perspective compared with FIG. 4, showing the manner in which files are loaded and then the order in which the code segments within the files obtain control. Control flow 500 shows the manner in which a program, device driver, or set of instructions passes control from one component to another. A generalized sequence of steps performs part of the boot sequence of the client, and each step completes a portion of the sequence before relinquishing control to the next portion Each of these components comprises instructions that are executed to perform a set of functions. BIOS ROM 510 initializes the client, loads BCL 512, and passes control to BCL 512. As shown, BCL 512 may contain a plurality of components that are not necessarily executed sequentially before relinquishing control. Once BCL 512 has loaded RCP 514, BCL 512 passes control to RCP 514, which loads components 516, which may contain programs and/or device drivers. RCP 514 may direct control of components 516 or may pass control to components 516, which are not necessarily executed sequentially. Once operating system 518 sent by RIPLMENU has been retrieved from the server, control of the client computer is relinquished to operating system 518, which then proceeds to complete the boot process for the client. Data flow 520 shows the data or set of instructions which are loaded by the software components shown as control flow 510. Although the components in data flow 520 have been given names, these file names may be used for representative purposes only. Other configurations of components in data flow 520 may also be incorporated, and the depicted example in FIG. 5 is not meant to imply configural limitations with respect to the present invention. Locations 530 provide information on the source location for the components in data flow 520.

Figure 6:
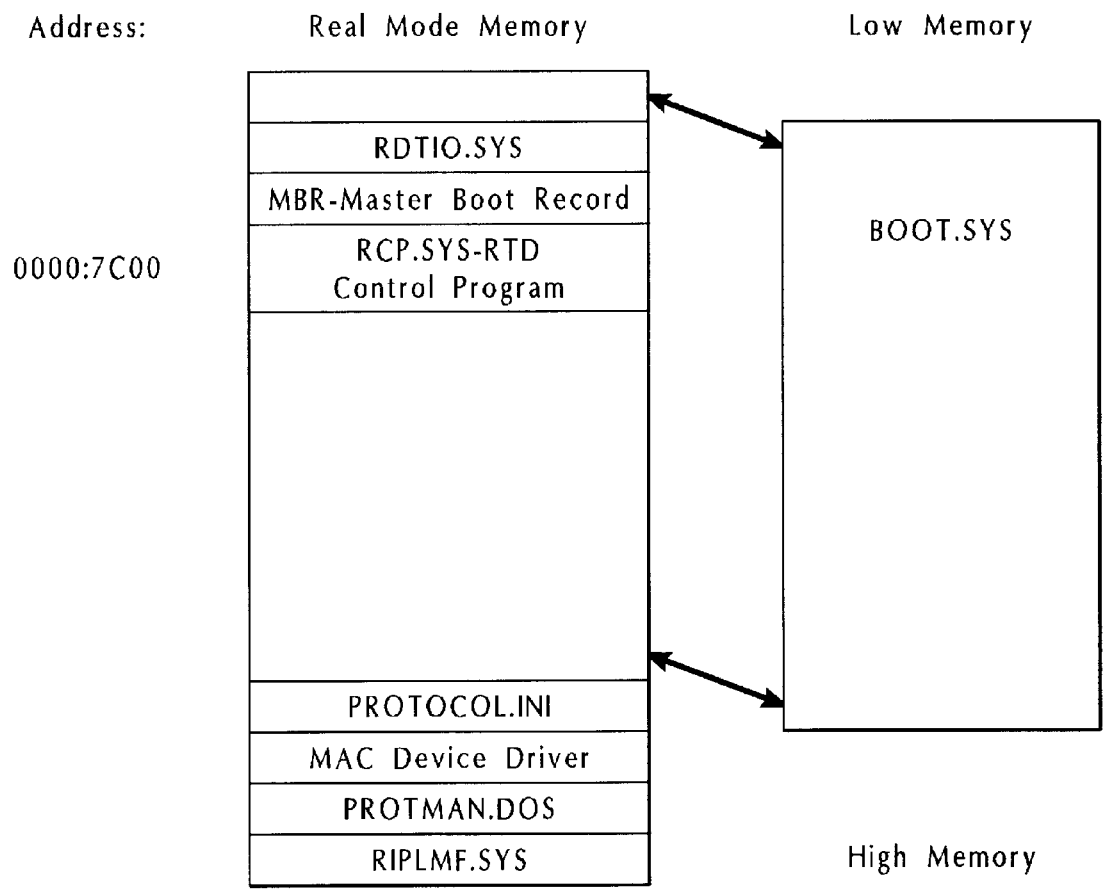
FIG. 6 depicts a diagram of workstation memory.

With reference now to FIG. 6, a block diagram depicts a memory map of real mode memory in a 80×86 machine as used in the present invention. Virtually all PC's in use today allow real mode addressing from location zero (0000:0000) to 640k (AOOO:0000). The diagram shows that the BCL, consisting of the MBR and RDTIO, locate themselves in low storage, and load RCP.SYS at location 0000:7COO. This is actually a predefined location where code will be loaded by the BIOS when booting from a diskette. RCP then loads all required modules into the highest addresses possible. This is done so that the BOOT.SYS files sent by RIPLMENU can be loaded in low memory at the operating systems own requested location. When all drivers have been loaded and initialized, RCP gives control to RIPLMF in high memory and is no longer required. RIPLMF will load BOOT.SYS over all of RCB's code in low memory. This can be done because all DOS emulation, which was done by the RCP, is no longer required. RIPLMF acts as both an application program and NDIS protocol device driver. As such, there is a guarantee that DOS emulation will not be necessary.

Figure 7:
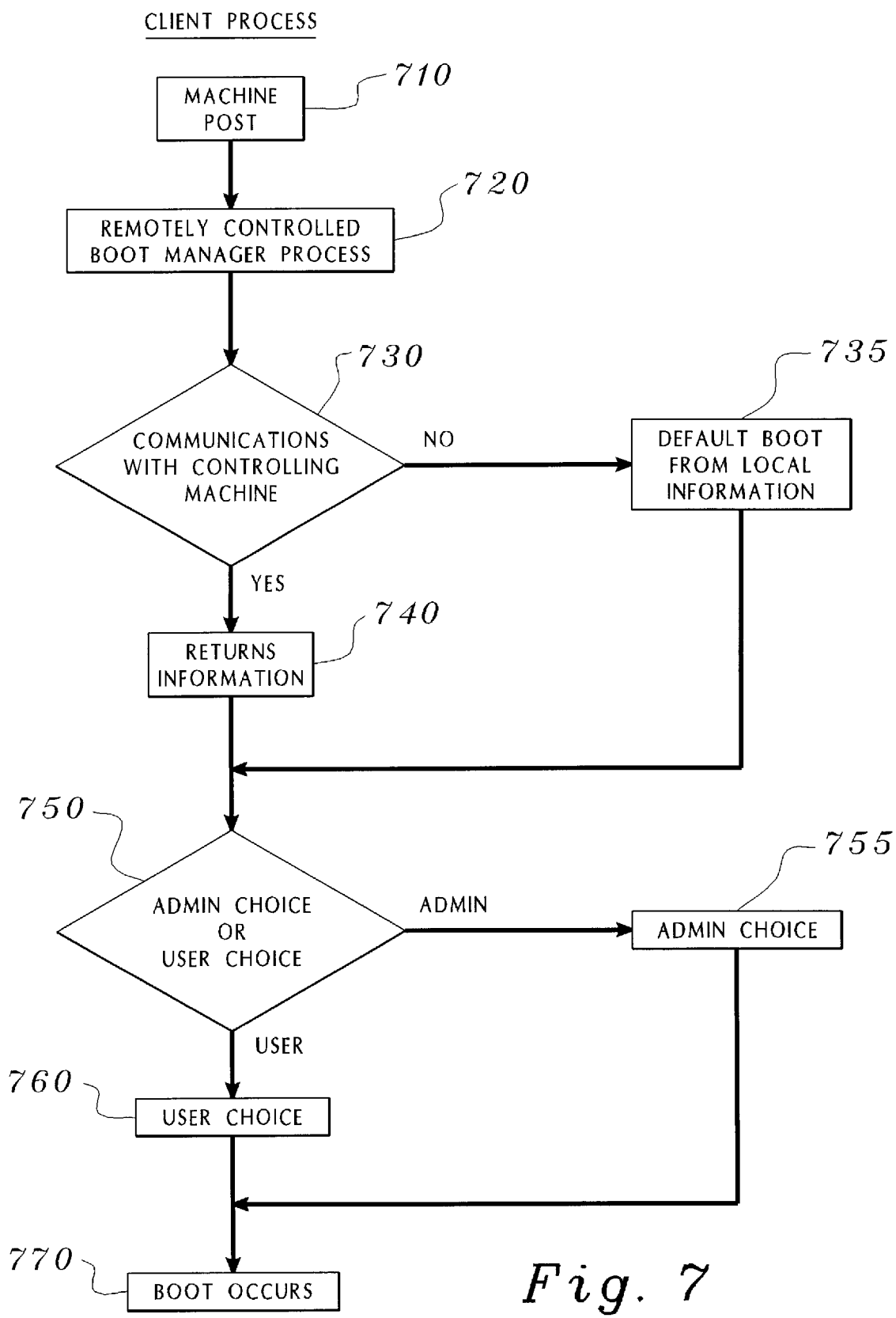
FIG. 7 depicts a flow chart of the workstation process.

FIG. 7 depicts the process at the workstation. The first step is the Machine Power On Self Test (POST) (710). The Machine is powered on and goes through its standard power on testing before giving control to the boot manager process. Next, the workstation program of the Remotely Controlled Boot Manager gets control (720) and attempts to communicate with the controlling server for the necessary boot information (730). If Contact is made with the controlling server it will result in the receipt of the boot menu (740). In this case the user would make a selection, if any, and the server would send the selected programs to the workstation. If Contact cannot be made with the boot server, the local default boot information, for that workstation, will be used (735). Given the boot manager information, one of two outcomes are possible (750). Either the user will be presented with choices (760) or a default (picked by the administrator) (755) will be used to boot the machine. The administrator picked default allows the administrator to dictate which system the workstation will boot but still allow the administrator to do so remotely. If the boot information mandates administrative choice (755), then the system is booted with the specification dictated by the administrator. If the boot information mandates user choice (760), then a menu is presented to the user for his/her choice on booted systems. The actual boot of the user chosen or administrator chosen system occurs.

Figure 8:
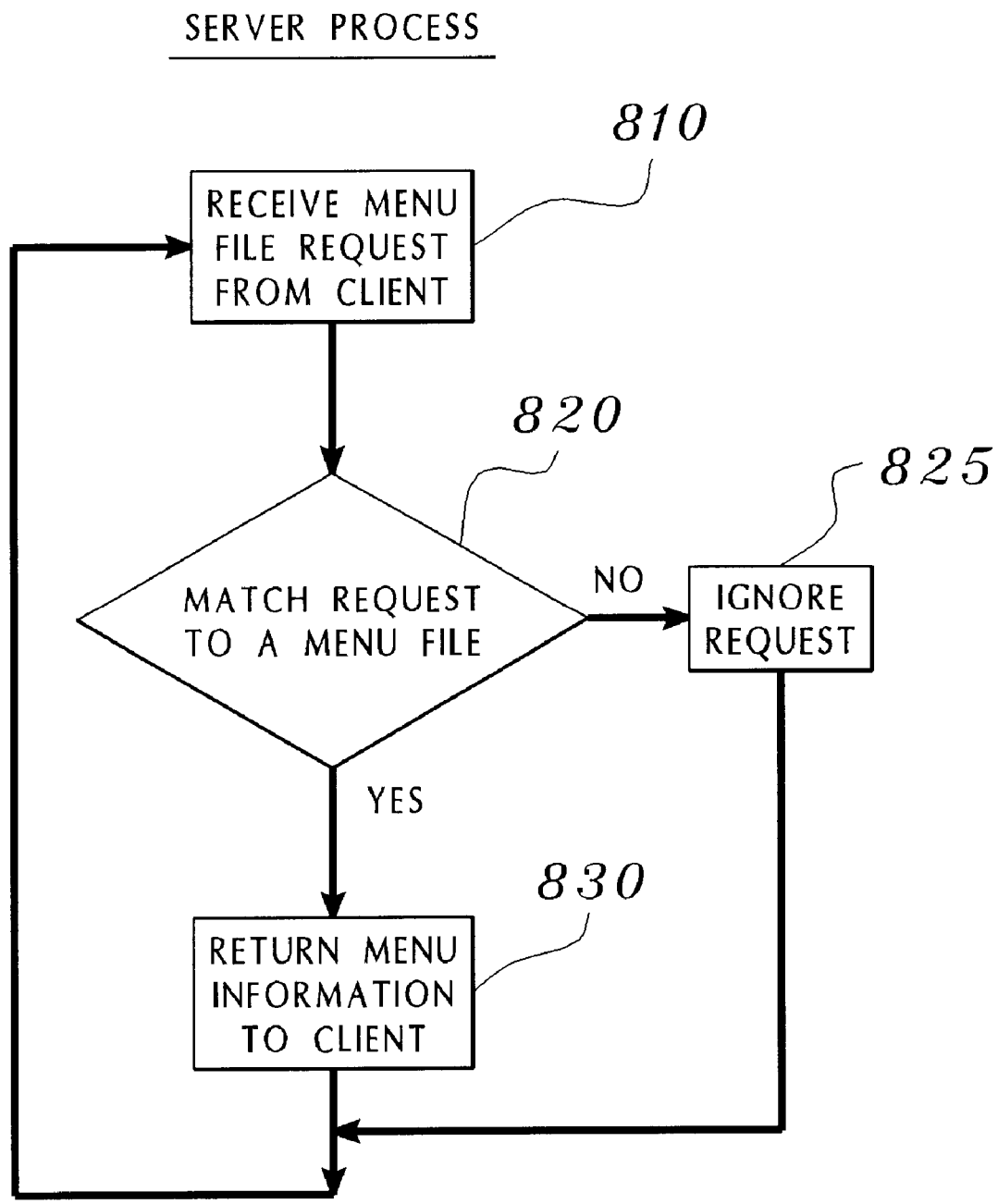
FIG. 8 depicts a flow chart of the server process.

FIG. 8 depicts the process at the server. First, the menu controller program (RIPLMENU) receives the request for the menu from the workstation (810). RIPLMENU then matches the request against the files in the server (820). For example, the MAC address for the workstation must correspond to an available menu file. If no match is made the request is ignored (825). If a match is made then the menu information is transmitted to the client workstation (830).

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for remote administration of options for booting one or more workstation computers without an operating system and having a medium access code from one or more server computers comprising the steps of:
    sending a request for a menu from the workstation to a server;
    responsive to matching the medium access code of the workstation to the menu, sending the menu to the workstation;
    receiving the menu, configured by an administrator for the workstation with the medium access code, from the server at the workstation;
    making a selection from at least one option in the menu;
    transmitting the selection to the server;
    receiving a program from the server in response to said selection; and
    booting said workstation from said program.

2. The method of claim 1 further comprising:
    executing a boot code loader in a workstation computer;
    loading a remote control program;
    sending a discovery frame having a medium access control address from the workstation computer; and
    intercepting the discovery frame at a server computer.

3. The method of claim 1 further comprising:
    specifying the medium access code to which a server will respond in a menu control program at the server computer.

4. A programmable apparatus for presenting pre-selected choices for booting a workstation to a user of the workstation comprising,
    programmable hardware comprising;
        at least one server computer; and
        a plurality of workstation computers without an operating system and having remote boot capability;
    a plurality of network interface cards connected to said programmable hardware;
    a network connecting said server computer and said workstation computers;
    a first program installed on said workstation computers;
    a second program installed on said server computer for providing a menu in response to a request from a first computer provided that said second program receives a discovery frame from said first computer and matches the medium access code in the discovery frame to a menu configured by a system administrator for the first computer;
    a plurality of operating systems installed on said server computer;

wherein at least one of said workstation computers is directed by said first program to execute a boot code loader, load a remote control program, send a discovery frame having a medium access control address and request the menu from said server computer; and
    responsive to intercepting the discovery frame and matching the medium access control code with the menu, sending the menu to the workstation; and
    responsive to receiving a request from the workstation, said server computer transmitting an operating system corresponding to said request to said workstation.

5. A computer readable memory for causing a first computer to present a menu to a plurality of second computers comprising:
    a first computer readable storage medium;
    a computer program stored in said storage medium;
    the storage medium, so configured by said computer program, responsive to a request from at least one second computer, causes the first computer to display a menu to said second computer provided that said computer program receives a discovery frame from said second computer and matches the medium access code in the discovery frame to a menu configured by a system administrator for the second computer; and
    responsive to a request from said second computer, cause the first computer to transmit a program selected from said menu to said second computer.

6. A computer implemented process to accomplish booting of a workstation computer from a server computer comprising:
    using a workstation computer, performing the following series of steps:
        powering the workstation computer;
        obtaining control of the workstation computer by means of a first program;
        executing, without an operating system, the first program to communicate with a network server by sending a discovery frame having a medium access control code;
        responsive to a second program in the server computer matching a menu to the medium access code, sending a menu of boot options to the workstation;
        receiving a menu of boot options from the server computer;
        selecting a boot option;
        receiving a program corresponding to the selected boot option;
        booting the first computer;
    using a second computer, performing the following series of steps:
        intercepting the discovery frame;
        responsive to intercepting the discovery frame, sending the menu that corresponds to the medium access code to the first computer; and
        responsive to the menu selection from the first computer, sending a program corresponding to the menu selection to the first computer.

7. A method for administering at a server computer, the booting of a client computer, the method comprising the computer implemented steps of:
    executing instructions from a client computer first memory to load a boot code loader from a client computer second memory, wherein the client computer first memory is a BIOS ROM and the client computer second memory is a nonvolatile, read/write memory:
    executing the boot code loader to load a control program from the client computer second memory;

executing the control program to load a set of programs from the client computer second memory without loading an operating system;

executing the set of programs to communicate a first message having a medium access code to a network server;

responsive to said first message, retrieving a menu corresponding to the medium access code from the network server;

sending the menu that corresponds to the medium access code to the client computer;

executing the set of programs to communicate a second message to a network server;

responsive to said second message, receiving at least one program from the network server; and;

executing the program at the workstation computer;

whereby the workstation computer is booted from the program.

* * * * *